United States Patent [19]

Campbell et al.

[11] Patent Number: 5,463,429
[45] Date of Patent: Oct. 31, 1995

[54] SURFACE INSPECTION OPTICAL GEOMETRY ALIGNMENT SYSTEM

[75] Inventors: Dean B. Campbell, Webster; Henry M. Korytkowski, Rochester, both of N.Y.

[73] Assignee: Eastman Kodak Company, Rochester, N.Y.

[21] Appl. No.: 152,798

[22] Filed: Nov. 15, 1993

[51] Int. Cl.[6] .................................................. H04N 7/18
[52] U.S. Cl. ........................ 348/128; 348/88; 348/95
[58] Field of Search ............................ 348/88, 94, 95, 348/125, 128, 129, 131, 135; H04N 7/18

[56] References Cited

U.S. PATENT DOCUMENTS

| | | | |
|---|---|---|---|
| 4,170,025 | 10/1979 | Benkley et al. | 358/139 |
| 4,234,890 | 11/1980 | Astle et al. | 358/10 |
| 4,337,394 | 6/1982 | Fukushima | 250/237 |
| 4,557,599 | 12/1985 | Zimring | 356/243 |
| 4,579,453 | 4/1986 | Makita | 356/375 |
| 4,609,939 | 9/1986 | Kozawa et al. | 358/101 |
| 4,688,088 | 8/1987 | Hamazaki et al. | 358/101 |
| 4,819,195 | 4/1989 | Bell et al. | 364/571.05 |
| 4,875,103 | 10/1989 | Bridges et al. | 358/214 |
| 4,945,417 | 7/1990 | Elberbaum | 358/210 |
| 4,945,501 | 7/1990 | Bell et al. | 364/571.05 |
| 4,951,141 | 8/1990 | Fischer | 358/139 |
| 4,951,223 | 8/1990 | Wales et al. | 364/507 |
| 5,020,006 | 5/1991 | Sporon-Fiedler | 364/550 |
| 5,119,190 | 6/1992 | Lemelson | 358/93 |
| 5,132,791 | 7/1992 | Wertz et al. | 348/88 |
| 5,140,418 | 8/1992 | Rivamonte | 358/139 |
| 5,181,098 | 1/1993 | Guerin et al. | 358/10 |
| 5,239,376 | 8/1993 | Dittmann et al. | 348/88 |
| 5,305,099 | 4/1994 | Morcos | 348/88 |

*Primary Examiner*—Tommy P. Chin
*Assistant Examiner*—Richard Lee
*Attorney, Agent, or Firm*—Thomas H. Close

[57] ABSTRACT

An alignment system for a scanning camera and illumination source includes a tape having a plurality of fiducials arranged systematically in opposition about a common center line. The camera is supported on a gimbaled platform for adjusting roll, pitch and yaw to bisect the tape fiducials with the camera scan line. The tape is mounted by holders received in datum definition hardware to insure intimate contact with a product surface. The holders facilitate adjustment of the tape fiducials relative to the machine center line in a surface inspection system such as a web scanner. Position indicating gauges facilitate alignment of an illumination source to the same center line.

24 Claims, 5 Drawing Sheets

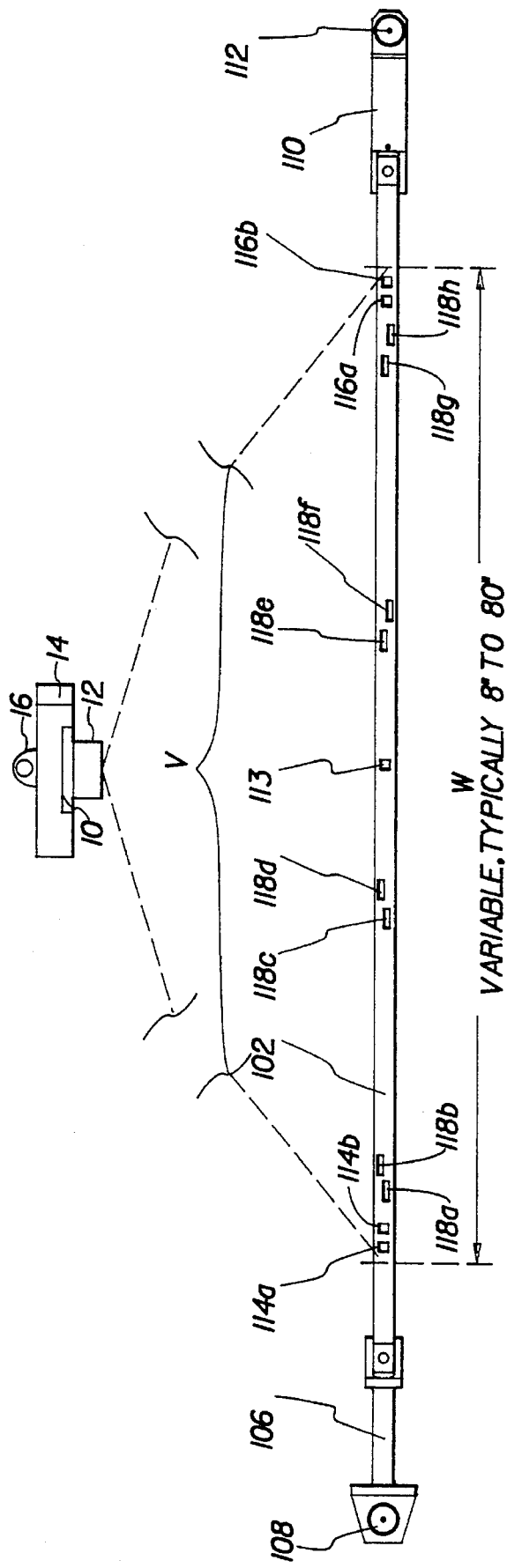
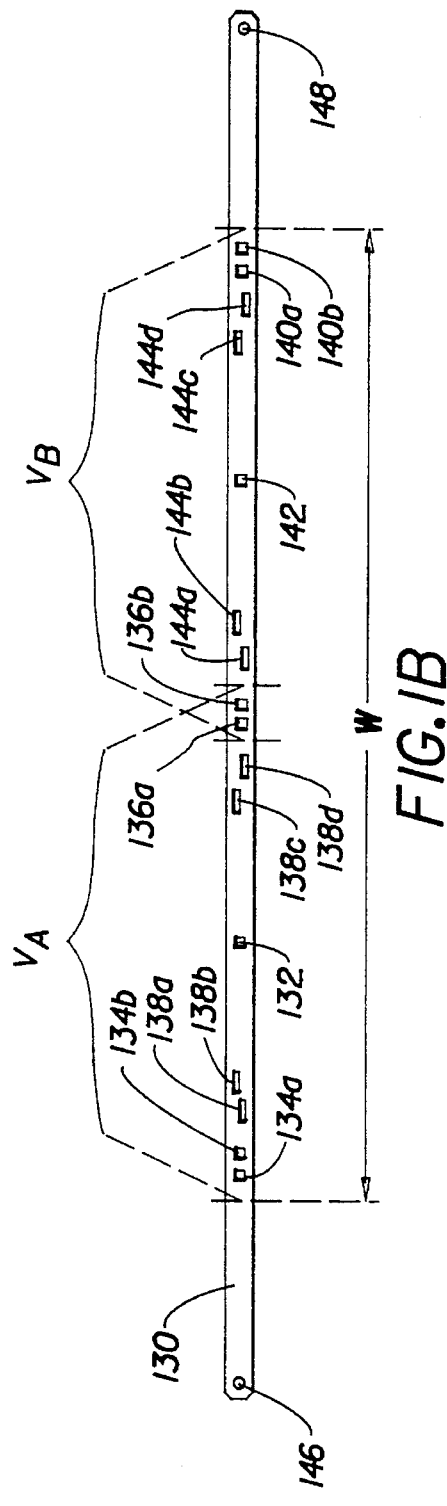

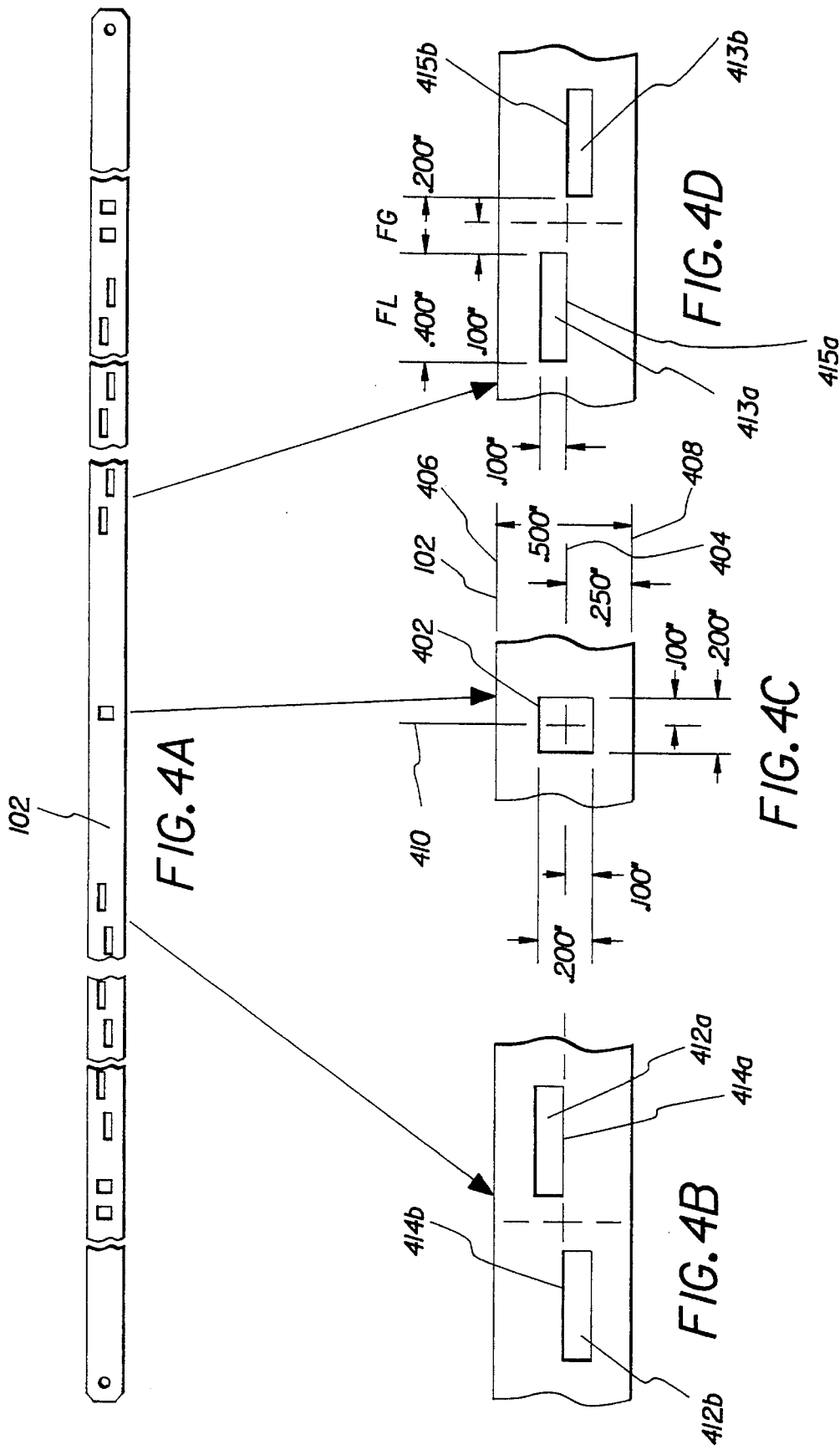

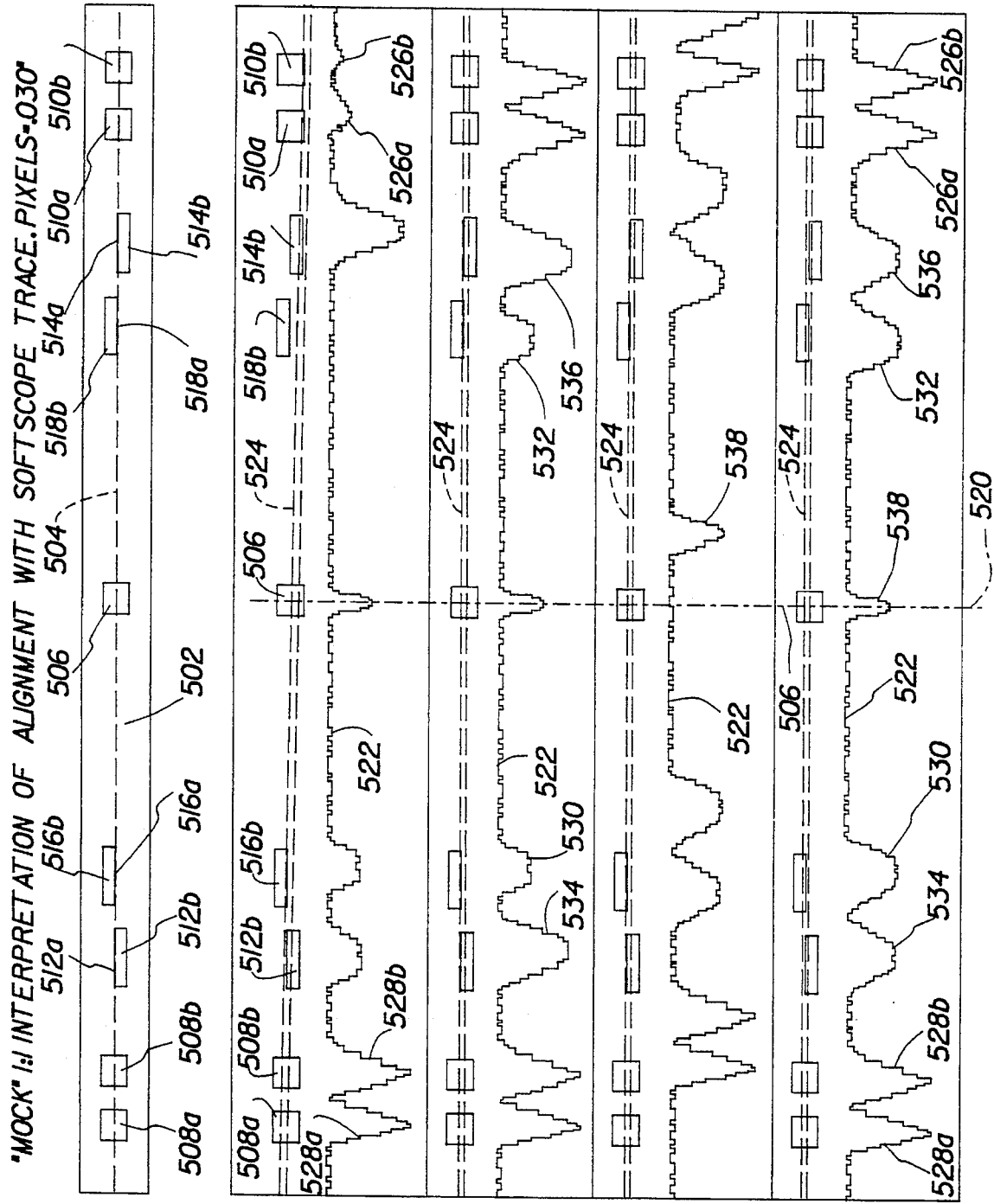

SURFACE INSPECTION OPTICAL GEOMETRY ALIGNMENT SYSTEM

FIELD OF THE INVENTION

The present invention relates to a surface inspection system for scanning a moving surface and, more particularly, to a surface inspection system which requires means for establishing and verifying optical front end inspection geometry.

BACKGROUND OF THE INVENTION

In the related art, a surface inspection system typically includes a camera system which is utilized for scanning moving surfaces, such as web production lines, in order to monitor and analyze the moving surface for quality control purposes. For instance, a moving surface such as a continuous production line of photographic paper may be passed in front of the camera system for the purpose of scanning the photographic paper for defects. The defects could include dark spots on the photographic paper. In this example, the related art typically has at least one camera connected to a processing unit such as a computer mainframe. The camera, which is placed in a position to scan the moving surface, provides data about the scan, generally in the form of a video signal. The camera is positioned to scan the moving surface according to the field of view provided by the camera. Accurate inspection requires proper alignment, relative to a target surface, of the field of view of the scanning camera as well as an illumination source utilized by the camera system.

Existing methods of establishing and verifying optical front end inspection geometry rely on time-consuming empirical approaches to achieve camera and illumination source alignment relative to the target surface. For instance, an inspection system for scanning a web production line with a target surface that is wider than the field of view of one camera has a plurality of cameras with an overlapping field of view. Related art in this instance "points" each of the plurality of cameras to a target area of the product to be scanned without verifying the precise field of view that is in fact covered by a particular camera. As a result, small areas of the product to be scanned may in fact be missed, resulting in an inferior inspection. Alternatively, a larger area of the product to be scanned may be double scanned by an excessive overlap of the field of view of the plurality of cameras, resulting in excessive equipment being used for the inspection.

Another problem in the related art is verifying that the illumination source necessary for camera inspection is in fact aligned precisely at the same target area of the product to be scanned that a particular field of view of a camera is aligned to. Typically, inspection of a product is performed across a large roller. Changing the diameter of the roller, for example with a necessary regrinding of the roller, changes the positioning the product to be scanned. This change in position requires a change in positioning of the camera and or light source which is typically accomplished by the previously mentioned time-consuming empirical approaches.

PROBLEM TO BE SOLVED BY THE INVENTION

A need has therefore been felt for a surface inspection optical geometry alignment system for aligning the field of view of a camera system designed to scan a production web or other target surface, whereby a master datum provides a fast, repeatable accurate and precise method to install, verify and correlate front end alignments and adjustments.

SUMMARY OF THE INVENTION

It is therefore an object of the present invention to provide a physical XYZ master datum for a target scan plane, an illumination source, and a camera, whereby the master datum will accommodate reflection and/or transmission mode inspection geometry.

It is a feature of the present invention to provide an alignment tape designed with a plurality of symmetrical opposed fiducials arranged about a common scan plane defined center line. The tape is mounted to a target machine datum definition hardware by holders that insure an intimate contact with the product surface. The holders provide proper tape tension and facilitate adjustment of the tape center line fiducial to the machine center line.

The illumination source is aligned to this center line by means of fixture-position-indicating gages in terms of distance, roll, pitch, and yaw. The camera is aligned in terms of roll, pitch, yaw by means of a gimbaled support platform so that its scan line is bisected by the tape fiducials in the XY planes. In addition to facilitating camera physical alignment, the tape fiducials also serve as camera focus adjustment targets.

A preferred embodiment of the present invention is a method for aligning the field of view for a camera system designed to scan a production web, said method comprising the steps of: providing a tape with fiducials patterned to split a pixel between a plurality of fiducials in front of the field of view of said camera system, whereby said fiducials provide alignment across multiple axes; verifying position of illumination source to said tape fiducials; monitoring a camera signal to determine multiple axes alignment adjustment; and adjusting roll, pitch and yaw on said camera to mechanically correct optical alignment of said field of view of said camera.

ADVANTAGEOUS EFFECTS OF THE INVENTION

An advantage of the present invention is that a master datum is provided as a unvarying initialization template by which optical front end in geometry can be precisely aligned and quickly verified.

Another advantage of the present invention is that the inspection process can be statistically controlled in order to verify that the inspection system with adjusted alignments remains identical to successive inspection iterations performed over time.

A further advantage of the present invention is the provision of a repeatable, accurate and precise means for the installation, correlation and verification of an inspection system's optical front end alignment.

A further advantage of the present invention is the adaptability to single and multiple camera reflection and transmission mode geometries.

A further advantage of the present invention is that front end alignment and verification can be accomplished within minuscule time flames.

BRIEF DESCRIPTION OF THE DRAWINGS

The advantages and features of the present invention will become better understood with reference to the following more detailed description and claims taking in conjuction with the accompanying drawings in which like elements are identified with like symbols and in which:

FIG. 1A shows a single camera system alignment tape with fiducials positioned within a scanned width defined by a field of view of the single camera;

FIG. 1B shows a dual camera system alignment tape with a plurality of fiducials positioned within a scanned width defined by overlapping a first field of view from a first camera and a second field of view from a second camera;

FIG. 3A is a top view of a portable unfixed tape datum with an alignment tape fixed there between;

FIGS. 4A–4D depicts drawings which are useful in describing the recurring fiducials in a single camera system alignment tape, whereby the fiducial sizes and relationship to a center line are shown;

FIG. 5A shows a basic tape for alignment with fiducials according to the present invention; and FIGS. 5B–5E, to be read in conjunction with FIG. 5A, show camera signals obtained as a result of camera scan alignment relative to the alignment tape fiducials of FIG. 5A in terms of roll, pitch, and yaw misalignments, in comparison to a camera signal obtained with an ideal alignment.

DESCRIPTION OF THE PREFERRED EMBODIMENTS

1. Detailed Description of the Figures

Figure 2:
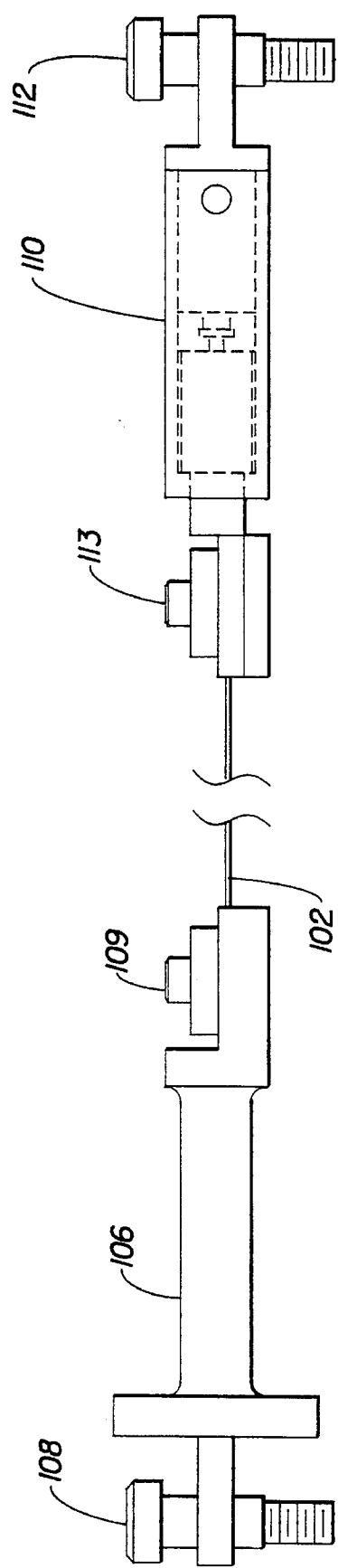
FIG. 2 is a side view of the alignment tape holders with a master datum on a fixed side datum and a minor datum on a tension side spring.

Referring now to FIG. 1A, an illumination source 10 and camera 12 are depicted in a single camera system with alignment tape 102 according to the present invention. Tape 102 is shown connected between a fixed side datum tape holder 106 which includes a datum -X-Y-Z- master 108, and a tension spring side datum 110 which includes a datum -X-Y- minor 112. The tape 102 is preferably fabricated from a stainless steel strip measuring about 0.5 inch wide, about 0.005 inch thick, and about the length of a scan width W, which represents the target surface to be scanned. The scan width W, as defined by a field of view V of the single camera, is variable and typically ranges between 8 inches to 80 inches.

Square and rectangular orifices or fiducials are laser-burned or otherwise cut into the tape 102 in a pattern designed according to the present invention as described in FIG. 4. A square fiducial 113 indicates a center point within the scan width W. A pair of square fiducials 114a & 114b, together with a pair of fiducials 116a & 116b, delineate the outermost edges of the scan width W. In addition, a plurality of pairs of rectangular fiducials, shown in FIG. 1A as fiducials 118a & 118b, 118c & 118d, 118e & 118f, and 118g & 118h, are interspersed between the outermost edge square fiducials 114a & 114b and 116a & 116b.

In FIG. 1B, a dual camera system alignment tape 130 is shown independent of the tape holder 106, 110. The tape 130 has a scan width W which is defined by an overlap O of a field of view $V_A$ from a first camera and a field of view $V_B$ from a second camera. A center point of the field of view $V_A$ is identified by a square fiducial 132. A first outermost edge of the field of view $V_A$ is defined by a pair of square fiducials 134a & 134b, and a second outermost edge of the field of view $V_A$ is defined by a pair of fiducials 136a & 136b. A pair of rectangle fiducials 138a & 138b and 138c & 138d are interspersed between the outermost edge square fiducials 134a & 134b and 136a, 136b.

Likewise the outermost edge square 136a, 136b also define a first outermost edge of the field of view $V_B$. A second outermost edge of the field of view $V_B$ is defined by a pair of square fiducials 140a, 140b. The square fiducials 136a, 136b are located within the overlap O of the field of view $V_A$ and the field of view $V_B$. Finally, a square fiducial 142 identifies a center point of the field of view $V_B$ and pairs of rectangular fiducials 144a & 144b and 144c & 144d are interspersed between the outermost edge square fiducials 136a, 136b, and 140a, 140b. The tape 130 is provided with a connecting point 146 at a first end and connecting a connecting point 148 at a second end.

FIG. 2 is a side view of tape 102 connected between the fixed side datum tape holder 106 and the tension spring side datum tape holder 110. The tape holder 106 is provided with the datum master 108 as well as the connecting bolt 109. The tape holder 110 is equipped with a datum minor 112 and a connecting bolt 113.

Figure 3B:
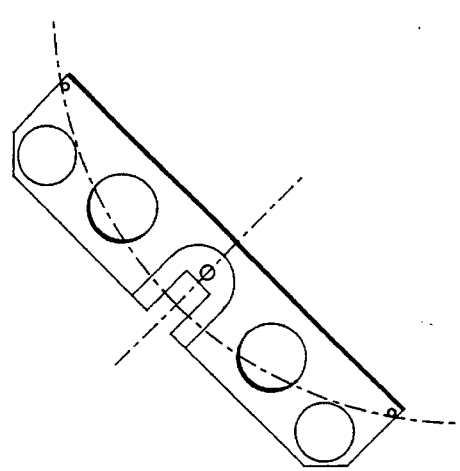
FIG. 3B is a side view of a portable tape datum adjustment mount.
Figure 3A:
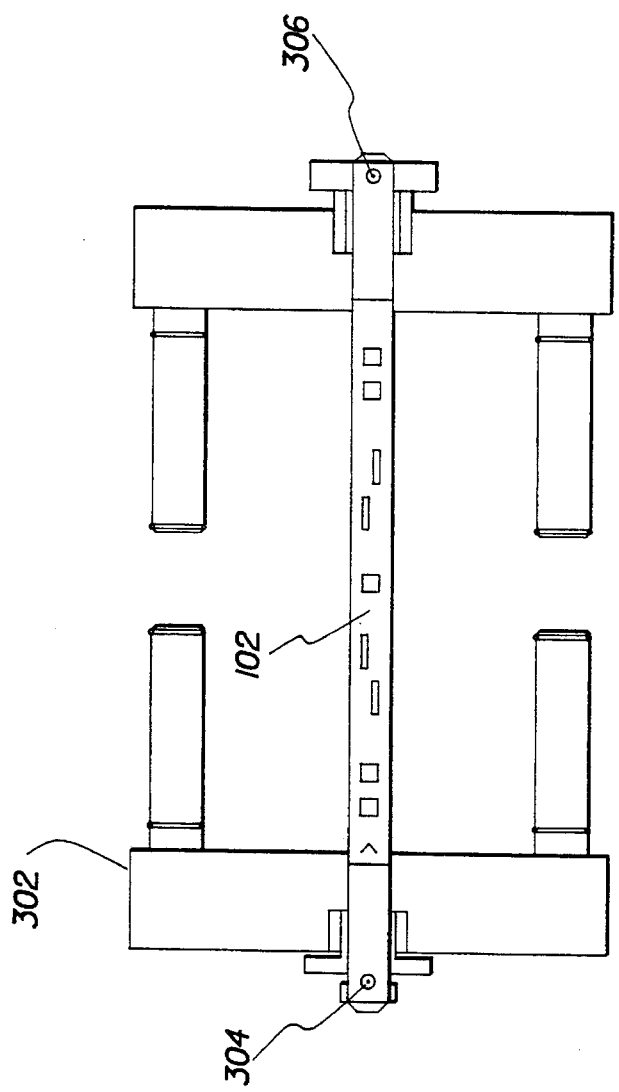

FIG. 3A is a top view of tape 102 connected to an unfixed tape datum 302 between an adjustable end 304 and a spring tension end 306.

FIG. 3B is a side view of the adjustable end 304 or the spring tension end 306 which can be adjusted by setting an angle with a sine bar or a digital protractor.

FIG. 4 shows a top view of a typical design layout of a plurality of various fiducials in the tape 102, according to the present invention. A center square fiducial 402, which identifies a center point of the scan width W designated by the tape 102, is positioned on the tape 102 to be bisected by a center line 404 extending the length of the tape 102 and located at the position approximately halfway between an edge 406 and an edge 408 of tape 102, for example, at 0.25 inches from either edge 406, 408 of a tape 102 that is 0.5 inches wide. In addition, the square fiducial 402 is bisected by a center line 410 which is located approximately half the distance between the outermost edge square fiducials which identify the scan width W. In a preferred embodiment, the tape 102 is 0.5 inches wide and 0.005 inches thick. The center square fiducial 402 measures 0.2 inches on each side and is located so that 0.1 inches to a side of square fiducial 402 can be measured from either side of center line 404 and center line 410.

A pair of rectangular fiducials for 412a and 412b are located on each of two opposing sides of the center square fiducials 402. These rectangular fiducials 412a & 412b, and 413a & 413b are twice the length of the square fiducial 402 and half the width of the square fiducials 402 and are separated by a distance equal to the length of the fiducial 402. For instance, each rectangular fiducial in the pair of rectangular fiducials 413a & 413b corresponding to a square fiducial 402 with 0.2 inch sides would have a fiducial length FL of 0.4 inches and a fiducial width FW of 0.1 inches; and the pair of rectangular fiducials would be separated by a fiducial gap FG of 0.2 inches. Further, the rectangular fiducials 412a & 412b and 413a & 413b are positioned on the tape 102 so that a bottom edge 414a, 415a of the topmost rectangular fiducials 412a, 413a from the pair of rectangular fiducials 412a & 412b and 413a & 413b is tangent to the center line 404. Likewise, a top edge 414b, 415b of the bottommost rectangular fiducials 412b, 413b from the pair of rectangular fiducials 412a & 412b and 413a & 413b is also tangent to the center line 404. In this manner a pixel which is typically 1/40,000 inch wide can be located at the position at the center line 404 and can be identified by the pair of rectangular fiducials 412a & 412b and 413a & 413b when a camera signal as shown in FIG. 5 dances between the position of either of the fiducials 412a, 413a and the position of either of the fiducials 412b, 413b, respectively; in effect, the pixel is split between a topmost rectangular fiducial 412a, 413a and a bottommost rectangular fiducial 412b, 413b.

The above described apparatus thus provides an alignment tape 102 (FIG. 1) designed with a plurality of symmetrical opposed fiducials 113, 114a & b, 116a & b, and 118a, b, c, d & e. The fiducials are arranged about a common scan plane defined center line. The tape is mounted to a target machine datum definition hardware by holders 106 (FIGS. 1–3B) that insure intimate contact with the product surface. The holders provide proper tape tension and facilitate adjustment of the tape center line fiducial to the machine center line. The illumination source 10 (FIG. 1) is aligned to this center line by means of fixture-position-indicating gages in terms of distance, roll, pitch, and yaw. The camera is aligned in terms of roll, pitch, yaw by means of a gimbaled support platform 16 so that its scan line is bisected by the tape fiducials in the XY planes. In addition to facilitating camera physical alignment, the tape fiducials also serve as camera focus adjustment targets. Signal processing is provided by signal monitor and microprocessor 14 (FIG. 1).

2. Operation of the Preferred Embodiments

Referring to FIG. 5A, a basic tape 502 for alignment with fiducials according to the present invention is shown. FIG. 5A is included for comparison when being read in conjunction with each of FIGS. 5B to 5E. The FIGS. 5B to 5D show camera signals obtained as a result of camera scan alignment relative to the alignment tape fiducials of FIG. 5A in terms of roll, pitch, and yaw misalignments, in comparison to a camera signal obtained with an ideal alignment in FIG. 5E.

The waveforms of the camera signals represent the amount and positioning with respect to perpendicular center lines (described below) of an illumination source coming from a camera and getting deflected back through the alignment tape fiducials. Therefore, an important aspect of the present invention is not only that the camera scan is properly aligned with the perpendicular center lines, but also that the illumination source is similarly aligned. The length and positioning of each waveform indicates the alignment of the camera scan alignment relative to the alignment tape fiducials in terms of roll, pitch and yaw misalignments.

Roll, pitch and yaw misalignments are best explained in terms of flying an airplane. An airplane that is properly aligned with its direction of travel is flying most efficiently because the plane experiences no adverse effects from roll, pitch or yaw misalignments. If the plane flying with its wings not parallel to the horizon is described as having roll misalignment. If the airplane is flying tilted so that its nose was located in a plane X different than a plane Y where its tail was located, wherein plane X,Y represent cross-sectional surfaces of the plane drawn parallel to the ground, then the airplane is described as having pitch misalignment. Finally, if the airplane is flying so that one wing points more forward than a corresponding opposite wing (in essence, the plane is flying sideways), then the airplane is described as having yaw misalignment.

Referring now to the present invention, as described with FIG. 4, tape 502 has a first center line 504 which bisects a center square fiducial 506 as well as each square fiducial 508a, 508b of a first pair of the scan width W edge-defining fiducials and each square fiducial 510a, 510b of a second pair of the scan width W edge-defining fiducials. Furthermore, the center line is also tangent with a top edge 512a, 514a of a bottommost rectangular fiducial 512b, 514b, as well as tangent with a bottom edge 516a, 518a of a topmost rectangular fiducial 516b, 518b. The tape 502 is aligned so that the center line 504 corresponds to a center line (not shown) of a desired field of view with a scan width W. In essence, the first center line 504 represents the horizon from the above-described airplane example which described roll, and each fiducial represents a strategically-placed "port of view" to determine alignment. Specifically, the bottommost rectangular fiducials 512b, 514b represent "ports of view" of the plane X from the aforementioned airplane example which described pitch, and topmost rectangular fiducials 516b, 518b represent "ports of view" of the plane Y from the same airplane example, wherein plane X is closer to the ground surface than plane Y is in this embodiment of tape 502.

Additionally, the tape 502 has a second center line 520 which bisects the center square fiducial 506 and is perpendicular to the first center line 504. The tape 502 is aligned so that the second center line 520 corresponds to a second center line (not shown) of the desired field of view with a scan width W. FIGS. 5A to 5E are each shown properly aligned to the center line 520.

FIG. 5B shows a camera signal 522 obtained as a result of camera scan alignment relative to the alignment tape fiducials 508a, 508b, 512b, 516b, 506, 518b, 514b, 510a, 510b in terms of roll misalignment. A center scan line of one pixel-width in a particular field of view is represented by a dashed double line of alignment 524. A preferred embodiment of the present invention views the line of alignment 524 in conjunction with all fiducials on the tape 502 as well as with the camera signal 522, as shown in FIG. 5B. A roll waveform 526a, 526b (corresponding to illumination being deflected through fiducials 510a, 510b), which is shorter than a roll waveform 528a, 528b (corresponding to illumination being deflected through fiducials 508a, 508b), aptly indicate that roll is misaligned—in essence, the one-pixel width line of alignment 524 (i.e. the "wings") is not properly aligned with the center line 504 (i.e. the "horizon"). Roll is properly aligned within the one-pixel width of the line of alignment 524 equal amounts of illumination are deflected though each of the fiducials 508a, 508b and 510a, 510b, as shown by the camera signal 522 in FIG. 5E where the dimensions of the roll waveforms 528a, 528b approximately equal the dimensions of the roll waveforms 526a, 528b.

Similarly, FIG. 5C shows the camera signal 522 obtained as a result of camera scan alignment relative to the aforementioned tape fiducials in terms of pitch misalignment. A preferred embodiment of the present invention views the line of alignment 524 in conjunction with all fiducials on the tape 502 as well as with the camera signal 522, as shown in FIG. 5C. A pitch waveform 530, 532 (corresponding to illumination being deflected through fiducials 516b, 518b), which is shorter than a pitch waveform 534, 536 (corresponding to illumination being deflected through fiducials 512b, 514b), aptly indicate that pitch is misaligned—in essence, the one-pixel width line of alignment 524 is not properly aligned with the center line 504. Pitch is properly aligned within the one-pixel width of the line of alignment 524 when equal amounts of illumination are deflected though each of the fiducials 512b, 514b, 516b, and 518b (all of which share either a topmost half-pixel width or a bottommost half-pixel width of the center line 504), as shown by the camera signal 522 in FIG. 5E where the dimensions of the pitch waveforms 530, 532 (corresponding to the topmost fiducials 516b, 518b) approximately equal the dimensions of the pitch waveforms 534, 536 (corresponding to the bottommost fiducials 512b, 514b).

Finally, FIG. 5D shows a camera signal 522 obtained as a result of camera scan alignment relative to the aforementioned tape fiducials in terms of yaw misalignment. A preferred embodiment of the present invention views the line of alignment 524 in conjunction with all fiducials on the tape 502 as well as with the camera signal 522, as shown in FIG. 5D. Yaw waveform 538 (corresponding to illumination being deflected through the center fiducial 506), which is located away from the center fiducial 506 and the center line 520, particularly in the direction toward fiducial 518b, aptly indicates that yaw is misaligned, particularly in the direction toward fiducial 518b—in essence, illumination is being deflected through the center fiducial 506 at an angle representing the intensity that yaw is misaligned. Notice that when the yaw waveform 538 indicates a yaw misalignment, all other waveforms in the camera signal 522 are similarly located away from their corresponding fiducials. Yaw is properly aligned when illumination is deflected through each fiducial at an angle of 0°, as shown by the camera signal 522 in FIG. 5E where each waveform is centered below a corresponding fiducial, and in particular, where the waveform 538 is approximately bisected by the center line 520.

The foregoing description is included to illustrate the operation of the preferred embodiment and is not meant to limit the scope of the invention. The scope of the invention is to be limited only by the following claims. From the foregoing description many variations will be apparent to those skilled in the art that would yet be accomplished by the spirit and scope of the invention.

PARTS LIST FOR FIGS. 1–5

102=SINGLE CAMERA SYSTEM ALIGNMENT TAPE
106=FIXED SIDE DATUM TAPE HOLDER
108=DATUM -X-Y-Z- MASTER
110=TENSION SPRING SIDE DATUM
112=DATUM -X-Y- MINOR
W=SCAN WIDTH
V=FIELD OF VIEW
113=SQUARE FIDUCIAL (CENTER POINT)
114a, 114b, 116a, 116b=FIDUCIAL PAIRS (OUTERMOST EDGES)
118a–h=PAIRS OF RECTANGULAR FIDUCIALS
130=DUAL CAMERA SYSTEM ALIGNMENT TAPE
O=OVERLAP
132=SQUARE FIDUCIAL (CENTER POINT OF $V_A$)
134a, 134b32 SQUARE FIDUCIAL (FIRST OUTERMOST EDGE OF $V_A$)
136a, 136b=SQUARE FIDUCIAL (SECOND OUTERMOST EDGE OF $V_A$ & SECOND OUTERMOST EDGE OF $V_B$)
138a–d=RECTANGULAR FIDUCIAL PAIRS
140a, 140b=SQUARE FIDUCIAL (SECOND OUTERMOST EDGE OF $V_B$)
142= SQUARE FIDUCIAL (CENTER POINT OF $V_B$)
144a–d=RECTANGULAR FIDUCIAL PAIRS
146, 148=CONNECTING POINT
302=UNFIXED TAPE DATUM
304=ADJUSTABLE END
306=SPRING TENSION END
402=CENTER SQUARE FIDUCIAL
404=CENTER LINE
406, 408=EDGE OF TAPE 102
410=CENTER LINE
412a, 412b, 413a, 413b=PAIRS OF RECTANGULAR FIDUCIALS
414a, 415a=BOTTOM EDGE
414b, 415b=TOP EDGE
502=BASIC TAPE
504=FIRST CENTER LINE
506=CENTER SQUARE FIDUCIAL
508a–b, 510a–b=SQUARE FIDUCIAL
512a, 514a=TOP EDGE
512b, 514b=BOTTOMMOST RECTANGULAR FIDUCIAL
516a, 518a=BOTTOM EDGE
516b, 518b=TOPMOST RECTANGULAR FIDUCIAL
520=SECOND CENTER LINE
522=CAMERA SIGNAL
524=DASHED DOUBLE LINE OF ALIGNMENT
526a–b, 528a–b=ROLL WAVEFORM
530, 532=TOP PITCH WAVEFORM
534, 536=BOTTOM PITCH WAVEFORM
538=YAW WAVEFORM

What is claimed is:

1. A method for aligning a camera system with a production web for scanning the web, said camera system defining an elongate field of view having first and second opposed longitudinal edges, said method comprising the steps of:

providing an alignment tape with a plurality of fiducials including pairs of first and second fiducials disposed to longitudinally bisect the field of view from said first and second opposed longitudinal edges, respectively, wherein said plurality of fiducials is patterned to split a pixel between a first and a second fiducial of said plurality of fiducials, and whereby said plurality of fiducials provide alignment across multiple axes;

monitoring a camera signal to determine when said field of view is longitudinally bisected by said pairs of first and second fiducials; and adjusting said field of view of the camera system to mechanically correct optical alignment of said field of view according to said monitored camera signal.

2. The method according to claim 1, wherein a position of said first fiducial is systematically opposed from a position of said second fiducial.

3. The method according to claim 1, wherein said adjusting step corrects a roll misalignment of said field of view.

4. The method according to claim 3, wherein said roll misalignment of said field of view is determined by comparing a first waveform of said camera signal to a second waveform of said camera signal.

5. The method according to claim 1, wherein said adjusting step corrects a pitch misalignment of said field of view.

6. The method according to claim 5, wherein said pitch misalignment of said field of view is determined by comparing a first waveform of said camera signal to a second waveform of said camera signal.

7. The method according to claim 1, wherein said adjusting step corrects a yaw misalignment of said field of view.

8. The method according to claim 7, wherein said yaw misalignment of said field of view is determined by comparing a first waveform of said camera signal to a second waveform of said camera signal.

9. The method according to claim 1, comprising the step of:

verifying a position of an illumination source relative to said tape fiducials prior to said monitoring of said camera signal.

10. The method according to claim 9, comprising the step of:

directing an illumination source toward said tape fiducials prior to said position verifying.

11. The method according to claim 9, wherein said illumination source is directed approximately parallel to said field of view of said camera system.

12. A method for aligning an elongate field of view for a camera system to scan a moving surface, said method comprising the steps of:

providing an alignment tape with a plurality of fiducials, wherein a first set of fiducials define the field of view in the longitudinal direction and a second set of fiducials is disposed to split the field of view normal to the longitudinal direction between a first and a second fiducial;

monitoring a camera signal to determine when said field of view is split by said first and second fiducials; and adjusting said field of view of the camera system according to said monitoring of said camera signal, to mechanically correct optical alignment of said field of view.

13. The method according to claim 12, wherein a position of said first fiducial is systematically opposed from a position of said second fiducial.

14. A system for aligning an elongate field of view for a camera system designed to scan a production web, said field of view defining first and second longitudinal edges, said system comprising:

means for providing an elongate alignment tape with a plurality of fiducials including pairs of first and second fiducials disposed to bisect the field of view longitudinally from said first and second longitudinal edges, respectively, wherein said plurality of fiducials is patterned to split a pixel between a first and a second fiducial of said plurality of fiducials, and whereby said plurality of fiducials provide alignment across multiple axes;

means for monitoring a camera signal to determine an alignment adjustment across said multiple axes; and means for adjusting said field of view of the camera system, according to said camera signal, to mechanically correct optical alignment of said field of view.

15. The system according to claim 14, wherein a position of said first fiducial is systematically opposed from a position of said second fiducial.

16. The system according to claim 14, wherein said means for adjusting said field of view corrects a roll misalignment of said field of view.

17. The system according to claim 16, wherein said roll misalignment of said field of view is determined by comparing a first waveform of said camera signal to a second waveform of said camera signal.

18. The system according to claim 14, wherein said means for adjusting said field of view corrects a pitch misalignment of said field of view.

19. The system according to claim 18, wherein said pitch misalignment of said field of view is determined by comparing a first waveform of said camera signal to a second waveform of said camera signal.

20. The system according to claim 14, wherein said means for adjusting said field of view corrects a yaw misalignment of said field of view.

21. The system according to claim 20, wherein said yaw misalignment of said field of view is determined by comparing a first waveform of said camera signal to a second waveform of said camera signal.

22. The system according to claim 14, wherein said system further comprises:

verifying a position of an illumination source to said tape fiducials.

23. The system according to claim 22, wherein said system further comprises:

means for directing an illumination source toward said tape fiducials.

24. The system according to claim 22, wherein said illumination source is directed approximately parallel to said field of view of said camera system.

* * * * *